(12) United States Patent
Hou

(10) Patent No.: US 7,723,870 B2
(45) Date of Patent: May 25, 2010

(54) POWER SWITCH SYSTEM

(75) Inventor: Zhen Hou, Foshan (CN)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/873,231

(22) Filed: Oct. 16, 2007

(65) Prior Publication Data
US 2008/0290732 A1 Nov. 27, 2008

(30) Foreign Application Priority Data
May 21, 2007 (CN) .......................... 2007 1 0200662

(51) Int. Cl.
*H01H 47/00* (2006.01)
*H01H 83/00* (2006.01)
*H02J 7/00* (2006.01)
(52) U.S. Cl. ........................................ 307/125; 307/80
(58) Field of Classification Search .................. 307/80, 307/85, 125, 139
See application file for complete search history.

(56) References Cited

U.S. PATENT DOCUMENTS 6,091,617 A * 7/2000 Moran ........................ 363/142

2002/0050936 A1 * 5/2002 Kato et al. ................... 341/100
2006/0158485 A1    7/2006 Hill et al.

FOREIGN PATENT DOCUMENTS

CN    1655092 A    8/2005

* cited by examiner

*Primary Examiner*—Stephen W Jackson
*Assistant Examiner*—Carlos Amaya
(74) *Attorney, Agent, or Firm*—Jeffrey T. Knapp

(57) ABSTRACT

A power switch system (200) for selectively providing power from a primary power source and a secondary power source to an electronic device, includes a detecting module (24), and a selecting module (30). The detecting module is connected to the primary power source. The selecting module is connected to an output terminal of the detecting module, the primary power source, and the secondary power source, and outputs the power from the primary power source to the electronic device if the primary power source is available. The detecting module is configured for determining whether the primary power source is available for the electronic device and generating a switch signal if the primary power source is unavailable, and the selecting module outputs power from the secondary power source to the electronic device in response to the switch signal.

14 Claims, 3 Drawing Sheets

POWER SWITCH SYSTEM

BACKGROUND

1. Field of the Invention

The present invention relates to power switch systems, and particularly to a power switch system for selectively supplying a primary power and a secondary power.

2. Description of Related Art

In the computer field, USB (Universal Serial Bus) devices, such as USB hard disk, USB digital camera, USB projector etc., are widely used because they are hot-swappable, and provide a fast transmission speed. In these USB devices, a battery power source is usually built therein. When power provided by USB port in the computer is unstable or unavailable, the battery must be switched on to provide power.

Referring to FIG. 3, a typical power switch circuit 100 is shown. The power switch circuit 100 includes a diode D1, a resistor R1, and a transistor Q1. The emitter of the transistor Q1 is connected to a battery power terminal 10. The collector of the transistor Q1 as an output terminal 11 of the circuit 100 outputs the battery power. The anode of the diode D1 is connected to the base of the transistor Q1 and a USB power terminal 12 and is grounded via the resistor R1. The cathode of the diode D1 is connected to the output terminal 11.

When the diode D1 is turned on while the transistor Q1 is turned off, the USB power is output via the output terminal 11. However, if the USB power becomes unstable or unavailable, the transistor Q1 cannot be turned on due to stabilizing by the diode D1. Therefore, the battery power cannot be switched on for providing power, thus a USB device depending on the USB power will not function.

What is needed, therefore, is to provide a power switch system for switching between power sources immediately and efficiently.

SUMMARY

In a present embodiment, a power switch system for providing power from a primary power source and a secondary power source to an electronic device includes a detecting module, and a selecting module. The detecting module is connected to the primary power source. The selecting module is connected to an output terminal of the detecting module, the primary power source, and the secondary power source. The detecting module is configured for determining whether the primary power source is available for the electronic device and generating a switch signal if the primary power source is unavailable, and the selecting module outputs power from the secondary power source to the electronic device in response to the switch signal.

Advantages and novel features will become more apparent from the following detailed description of the present power switch system, when taken in conjunction with the accompanying drawings.

BRIEF DESCRIPTION OF THE DRAWINGS

Many aspects of the present power switch system can be better understood with reference to the following drawings. The components in the drawings are not necessarily drawn to scale, the emphasis instead being placed upon clearly illustrating the principles of the present power switch system. Moreover, in the drawings, like reference numerals designate corresponding parts throughout the several views.

Figure 1:
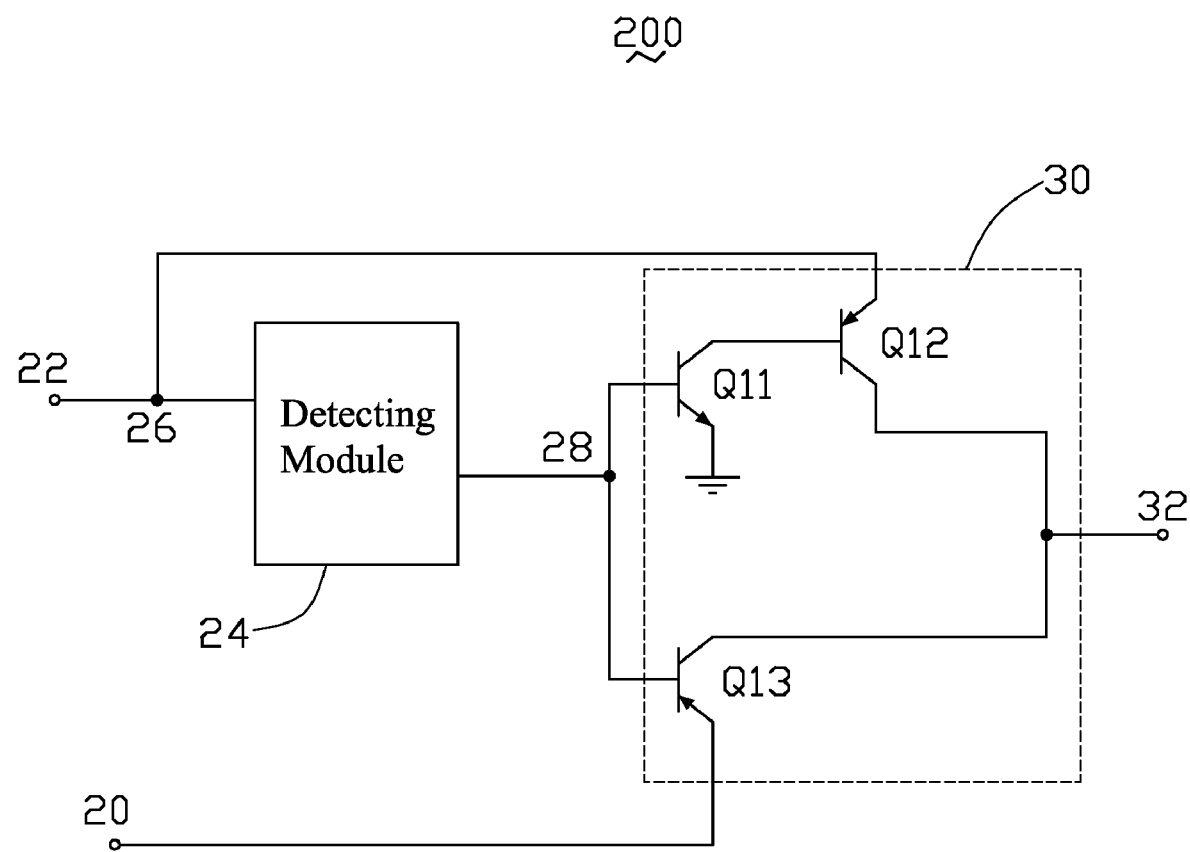
FIG. 1 is a circuit diagram of a power switch system according to a first present embodiment.

Corresponding reference characters indicate corresponding parts throughout the drawings. The exemplifications set out herein illustrate at least one present embodiment of the present power switch system, in one form, and such exemplifications are not to be construed as limiting the scope of the invention in any manner.

DETAILED DESCRIPTION OF THE INVENTION

Reference will now be made to the drawings to describe present embodiments of the power switch system.

Referring to FIG. 1, a power switch system 200, according to a first present embodiment, is shown. The power switch system 200 provides a primary power and a secondary power to an electronic device (not labeled), e.g., one peripheral electronic device of a computer. The power switch system 200 includes a selecting module 30 and a detecting module 24. The detecting module 24 is connected to a primary power source terminal 22. The selecting module 30 is connected to the detecting module 24, the primary power source terminal 22, and a secondary power terminal 20. The detecting module 24 is configured for determining whether the primary power source is stable or available and generating a switch signal if the primary power source 22 is unstable or unavailable. The selecting module 30 outputs the secondary power source in response to the switch signal to the electronic device via an output terminal 32 of the power switch system 200.

The detecting module 24 includes a detecting terminal 26 connected to the primary power source terminal 22, and a control terminal 28 for outputting a switch signal to the selecting module 30. The detecting module 24 compares voltage of the primary power source with a reference voltage preset in the detecting module 24. It is known that the reference voltage is preset by manufacturers. The detecting module 24 may be a comparator or other device having comparing ability.

The selecting module 30 includes a first transistor Q1, a second transistor Q12, and a third transistor Q13. The base of the first transistor Q11 is connected to the control terminal 28 of the detecting module 24 for receiving the switch signal. The emitter of the first transistor Q11 is grounded. The base of the second transistor Q12 is connected to the collector of the first transistor Q11, the emitter of the second transistor Q12 is connected to the primary power source terminal 22, and the collector of the second transistor Q12 outputs power from the primary power source via the output terminal 32 of the power switch circuit 200. The base of the third transistor Q13 is connected to the control terminal 28 of the detecting module 24 for receiving the switch signal, the emitter of the third transistor Q13 is connected to the secondary power terminal, and the collector of the third transistor Q13 outputs power from the secondary power source via the output terminal 32 of the power switch circuit 200.

In this present embodiment, the primary power source is a USB power source, and the secondary power source is a battery power source built into the peripheral electronic device of the computer.

Initially, the power switch system outputs power from the primary power source via the collector of the second transistor Q12.

When the primary power source becomes unavailable, i.e., the voltage of the primary power source is less than the reference voltage, the detecting module 24 generates a switch signal with a low voltage. The first transistor Q11 is turned off in response to the switch signal, thereby the second transistor Q12 is turned off, the third transistor Q13 is turned on, and the collector of the third transistor Q13 outputs power from the secondary power source.

When the primary power source is available, i.e., the voltage of the primary power source is greater than the reference voltage, the detecting module 24 generates a switch signal with a high voltage. The first transistor Q11 is turned on in response to the switch signal, thereby the second transistor Q12 is turned on, the third transistor Q13 is turned off, and the collector of the second transistor Q12 outputs power from the primary power source again.

Beneficially, the base of the third transistor Q13 may be grounded via a resistor. In this way, by selecting a resistance of the resistor, a voltage at the base of the third transistor Q13 can be adjusted. Flexibility of the power switch system 200 can be enhanced.

The emitter of the second transistor Q12 may be connected to the base of the second transistor Q12 via a circuit including a capacitor and an inductor in parallel. In this way, the second transistor Q12 is protected from damage.

The first, second, and third transistors Q11, Q12 and Q13 are selected from the group consisting of transistor, TTL (transistor-transistor logic), and CMOS (complementary metal oxide semiconductor).

Figure 2:
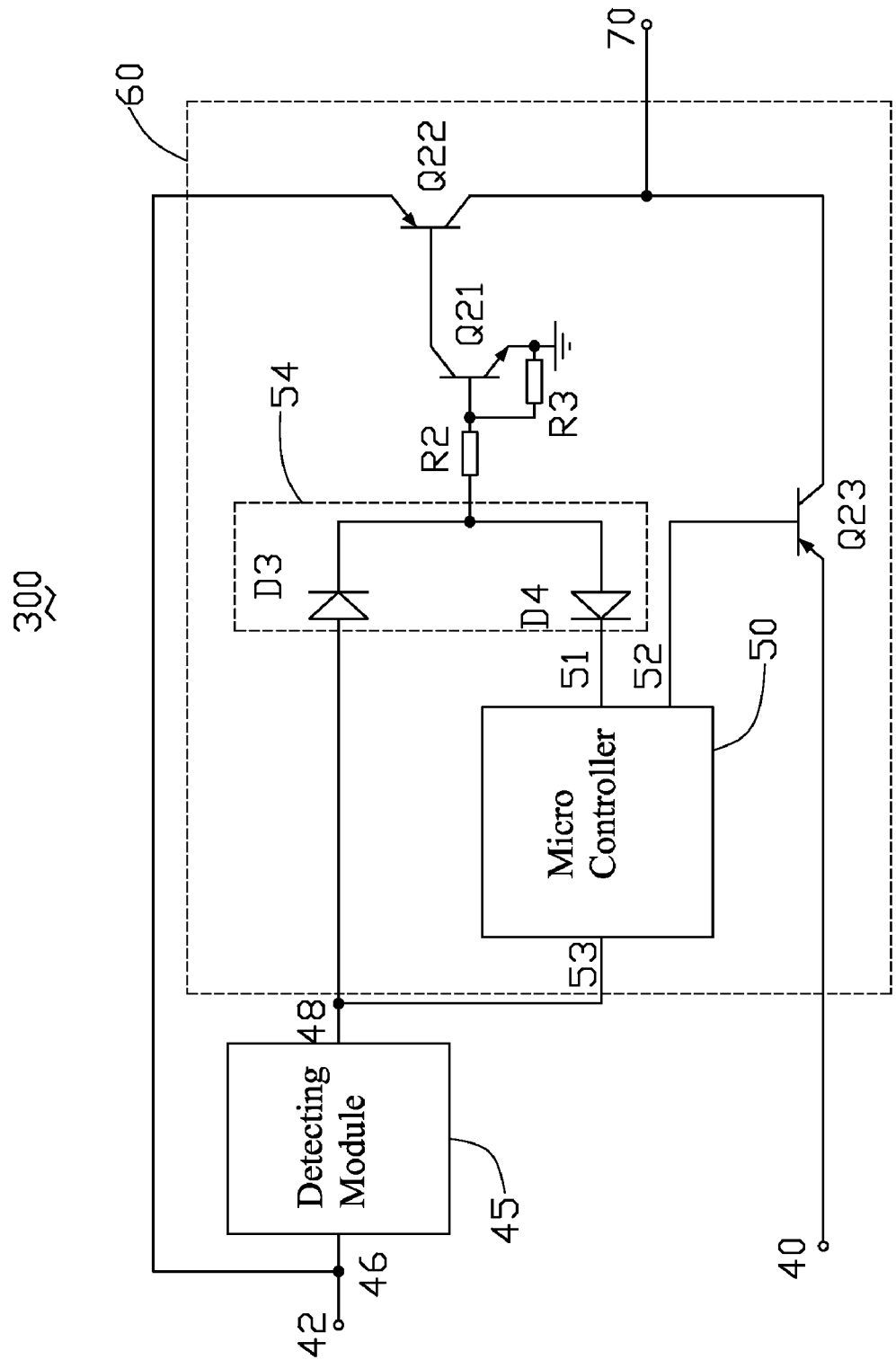
FIG. 2 is a circuit diagram of a power switch system according to a second present embodiment.
Figure 3:
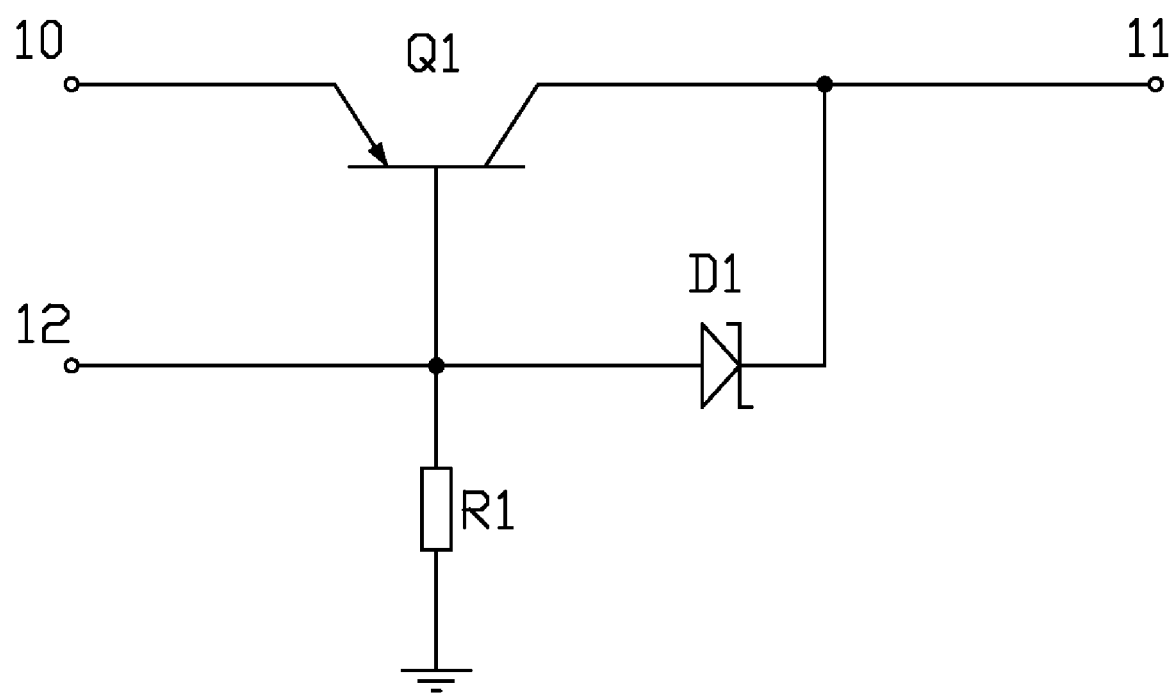
FIG. 3 is a circuit diagram of a typical power switch device.

Referring to FIG. 2, a power switch system 300, according to a second present embodiment, is shown. The power switch system 300 includes a detecting module 45 and a selecting module 60.

The detecting module 45 includes a detecting terminal 46 and an output terminal 48. The selecting module 60 includes a micro controller 50, a logical AND gate 54, a first resistor R2, a second resistor R3, a first transistor Q21, a second transistor Q22, and a third transistor Q23. The AND gate 54 includes a first diode D3 and a second diode D4. The micro controller 50 includes an input terminal 53, a first control terminal 51, and a second control terminal 52.

The detecting terminal 46 of the detecting module 45 is connected to a primary power source 42 (e.g., a USB power source). The output terminal 48 of the detecting module 45 for outputting the switch signal is connected to the anode of the diode D3 and the input terminal 53 of the micro controller 50. The terminals of the first resistor R2 are respectively connected to the cathode of the first diode D3 and the base of the first transistor Q21. The terminals of the second resistor R3 are respectively connected to the base and the emitter of the first transistor Q21. The collector of the first transistor Q21 is connected to the base of the second transistor Q22. The emitter of the second transistor Q22 is connected to the primary power source terminal 42.

The first control terminal 51 of the micro controller 50 is connected to the cathode of the second diode D4. The anode of the second diode D4 is connected to the cathode of the first diode D3 and the node therebetween is connected to the base of the first transistor Q21 via the resistor R2. The second control terminal 52 of the micro controller 50 is connected to the base of the third transistor Q23. The emitter of the third transistor Q23 is connected to a secondary power source 40 (e.g., a battery power source). The collector of the third transistor Q23 is connected to the emitter of the second transistor Q22 and together are connected to an output terminal 70 of the power switch system 300.

Function of the detecting module 45 in this present embodiment is similar to that of the detecting module 24 in the first present embodiment. In the micro controller 50, when an input voltage to the input terminal 53 of the micro controller 50 is high, output voltages of the first control terminal 51 and the second control terminal 52 both are high. When an input voltage to the input terminal 53 of the micro controller 50 is low, output voltages of the first control terminal 51 and the second control terminal 52 both become low. After one change, the output voltages of the first control terminal 51 and the second control terminal 52 are kept low even if the input voltage to the input terminal 53 of the micro controller 50 becomes low. In this situation, the micro controller 50 is reset in response to a control signal sent by an outside controller (e.g., a central processing unit).

When a voltage of the primary power source is greater than a reference voltage preset in the detecting module 45, voltage of the switch signal is high, thereby the first diode D3 is turned on and voltage to the input terminal 53 of the micro controller 50 is high. At this time, output voltages of the first control terminal 51 and the second control terminal 52 of the micro controller 50 are both high, thereby the second diode D4 is turned off and the third transistor Q23 is turned off, and output voltage of the AND gate 54 is high, thereby the first transistor Q21 is turned on turning on the second transistor Q22. As a result, the second transistor Q22 outputs power from the primary power source via the output terminal 70.

When voltage of the primary power source is less than the reference voltage preset in the detecting module 45, the switch signal is low, thereby the first diode D3 is turned off and voltage to the input terminal 53 of the micro controller 50 is low. At this time, output voltages of the first control terminal 51 and the second control terminal 52 of the micro controller 50 are both low, thereby the second diode D4 is turned off and the third transistor Q23 is turned on. Output voltage of the AND gate 54 is low, thereby the first transistor Q21 is turned off turning off the second transistor Q22. As a result, the third transistor Q23 outputs power from the secondary power source via the output terminal 70.

When voltage of the primary power source is greater than the reference voltage, voltage of the switch signal is high, thereby the first diode D3 is turned on and voltage to the input terminal 53 of the micro controller 50 is high. At this time, output voltages of the first control terminal 51 and the second control terminal 52 of the micro controller 50 are both kept low, thereby output voltage of the AND gate 54 is low and the third transistor Q23 is kept on, and the first and second transistor Q21, Q22 are kept off. As a result, the third transistor Q23 still outputs power from the secondary power source via the output terminal 70. As mentioned above, the micro controller 50 is reset in response to the control signal.

The first, second, and third transistors Q21, Q22 and Q23 are selected from the group consisting of transistor, TTL (transistor-transistor logic), and CMOS (complementary metal oxide semiconductor).

In this present embodiment, the power switch system 300 includes a micro controller 50. The micro controller 50 is reset in response to the control signal sent by a CPU. In this way, if the primary power source is very unstable, the power switch system 300 switches the primary power source to the secondary power source just one time. The secondary power is maintained as output, thus preventing frequent switching between the primary power source and the secondary power source.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A power switch system for selectively providing power from a primary power source and a secondary power source to an electronic device, the primary power source and the secondary power source being independent from each other, the power switch system comprising:
  a detecting module connected to the primary power source,
  a selecting module connected to an output terminal of the detecting module, the primary power source, and the secondary power source, and outputting power from the primary power source to the electronic device if the primary power source is available;
the detecting module being configured for determining whether the primary power source is available for the electronic device and generating a switch signal if the primary power source is unavailable, and the selecting module outputting power from the secondary power source to the electronic device in response to the switch signal, wherein the selecting module comprises a first transistor, a second transistor, and a third transistor; the emitter of the first transistor is grounded; the base of the first transistor is configured for receiving the switch signal; the base of the second transistor is connected to the collector of the first transistor; the emitter of the second transistor is connected to the primary power source and configured for receiving power from the primary power source; the collector of the second transistor is configured for outputting power from the primary power source; the base of the third transistor is configured for receiving the switch signal; the emitter of the third transistor is configured for receiving power from the secondary power source; the collector of the third transistor is configured for outputting power from the secondary power source.

2. The power switch system as claimed in claim 1, wherein the detecting module comprises a detecting terminal for receiving power from the primary power source, and a control terminal connected to the base of the first transistor and the base of the third transistor, and the switch signal is produced at the control terminal of the detecting module.

3. The power switch system as claimed in claim 1, wherein the transistor is selected from the group consisting of transistor, TTL (transistor-transistor logic), and CMOS (complementary metal oxide semiconductor).

4. A power switch system for selectively providing power from a primary power source and a secondary power source to an electronic device, the primary power source and the secondary power source being independent from each other, the power switch system comprising:
  a detecting module connected to the primary power source,
  a selecting module connected to an output terminal of the detecting module, the primary power source, and the secondary power source, and outputting power from the primary power source to the electronic device if the primary power source is available;
  the detecting module being configured for determining whether the primary power source is available for the electronic device and generating a switch signal if the primary power source is unavailable, and the selecting module outputting power from the secondary power source to the electronic device in response to the switch signal, wherein the selecting module comprises a first transistor, a second transistor, a third transistor, a micro controller including an input terminal connected to the output terminal of the detecting module, a first control terminal and a second control terminal, and a logical AND gate including a first input terminal connected to the output terminal of the detecting module, a second input terminal connected to the first control terminal of the micro controller, and an output terminal; the base of the first transistor is connected to the output terminal of the AND gate via a first resistor and is grounded via a second resistor; the emitter of the first transistor is grounded; the collector of the first transistor is connected to the base of the second transistor; the emitter of the second transistor is configured for receiving the power from the primary power source; the collector of the second transistor is configured for outputting power from the primary power source; the base of the third transistor is connected to the second control terminal of the micro controller; the emitter of the third transistor is configured for receiving power from the secondary power source; the collector of the third transistor is configured for outputting power from the secondary power source.

5. The power switch system as claimed in claim 4, wherein electrical level of output voltages of the first control terminal and the second control terminal of the micro controller are synchronized with that of the detecting terminal of the detecting module.

6. The power switch system as claimed in claim 4, wherein the logic AND gate comprises diode, transistor or complementary metal oxide semiconductor (CMOS).

7. A power switch system for selectively providing power from a primary power source and a secondary power source to an electronic device, comprising:
  a detecting module connected to the primary power source configured for determining whether the primary power source is available for the electronic device and generating a detected signal; and
  a selecting module configured for selectively outputting the power from one of the primary power source and the secondary power source to the electronic device according to the detected signal, the selecting module comprising a first transistor, a second transistor, a third transistor, and an output terminal for outputting the power; wherein the emitter of the first transistor is grounded; the base of the first transistor is connected to an output terminal of the detecting module for receiving the detected signal; the base of the second transistor is connected to the collector of the first transistor; the emitter of the second transistor is connected to the primary power source for receiving power therefrom; the collector of the second transistor is connected to the output terminal; the base of the third transistor is connected to the output terminal of the detecting module for receiving the detected signal, the emitter of the third transistor is connected to the secondary power source for receiving power therefrom; the collector of the third transistor is connected to the output terminal.

8. The power switch system as claimed in claim 7, wherein the selecting module farther comprises a micro controller comprising an input terminal connected to the output terminal of the detecting module, a first control terminal and a second control terminal, and a logical AND gate having a first input terminal connected to the output terminal of the detecting module, a second input terminal connected to the first control terminal of the micro controller, and an output terminal connected to the base of the first transistor such that the base of the first transistor receives the detected signal via the micro controller and the AND gate, the base of the third transistor is connected to the second control terminal of the micro controller to receive the detected signal via the micro controller.

9. A power switch system for selectively providing power from a primary power source and a secondary power source to an electronic device, the power switch system comprising:
  a detecting module connected to the primary power source,
  a selecting module connected to an output terminal of the detecting module, the primary power source, and the secondary power source, and outputting power from the primary power source to the electronic device if the primary power source is available;

the detecting module being configured for determining whether the primary power source is available for the electronic device and generating a switch signal if the primary power source is unavailable, and the selecting module outputting power from the secondary power source to the electronic device in response to the switch signal, wherein the selecting module comprises a first transistor, a second transistor, and a third transistor; the emitter of the first transistor is grounded; the base of the first transistor is configured for receiving the switch signal; the base of the second transistor is connected to the collector of the first transistor; the emitter of the second transistor is connected to the primary power source and configured for receiving power from the primary power source; the collector of the second transistor is configured for outputting power from the primary power source; the base of the third transistor is configured for receiving the switch signal; the emitter of the third transistor is configured for receiving power from the secondary power source; the collector of the third transistor is configured for outputting power from the secondary power source.

10. The power switch system as claimed in claim 9, wherein the detecting module comprises a detecting terminal for receiving power from the primary power source, and a control terminal connected to the base of the first transistor and the base of the third transistor, and the switch signal is produced at the control terminal of the detecting module.

11. The power switch system as claimed in claim 9, wherein the transistor is selected from the group consisting of transistor, TTL (transistor-transistor logic), and CMOS (complementary metal oxide semiconductor).

12. A power switch system for selectively providing power from a primary power source and a secondary power source to an electronic device, the power switch system comprising:

a detecting module connected to the primary power source, a selecting module connected to an output terminal of the detecting module, the primary power source, and the secondary power source, and outputting power from the primary power source to the electronic device if the primary power source is available;

the detecting module being configured for determining whether the primary power source is available for the electronic device and generating a switch signal if the primary power source is unavailable, and the selecting module outputting power from the secondary power source to the electronic device in response to the switch signal, wherein the selecting module comprises a first transistor, a second transistor, a third transistor, a micro controller including an input terminal connected to the output terminal of the detecting module, a first control terminal and a second control terminal, and a logical AND gate including a first input terminal connected to the output terminal of the detecting module, a second input terminal connected to the first control terminal of the micro controller, and an output terminal; the base of the first transistor is connected to the output terminal of the AND gate via a first resistor and is grounded via a second resistor; the emitter of the first transistor is grounded; the collector of the first transistor is connected to the base of the second transistor; the emitter of the second transistor is configured for receiving the power from the primary power source; the collector of the second transistor is configured for outputting power from the primary power source; the base of the third transistor is connected to the second control terminal of the micro controller; the emitter of the third transistor is configured for receiving power from the secondary power source; the collector of the third transistor is configured for outputting power from the secondary power source.

13. The power switch system as claimed in claim 12, wherein electrical level of output voltages of the first control terminal and the second control terminal of the micro controller are synchronized with that of the detecting terminal of the detecting module.

14. The power switch system as claimed in claim 12, wherein the logic AND gate comprises diode, transistor or complementary metal oxide semiconductor (CMOS).

* * * * *